United States Patent [19]

Handl et al.

[11] Patent Number: 5,074,058
[45] Date of Patent: Dec. 24, 1991

[54] PROCESSING ROOM FOR DRYING OR RIPENING FOODSTUFFS WHICH GIVE OFF HUMIDITY

[75] Inventors: Karl Handl, A-6551, Pians Nr. 33; Ortwin Höllrigl, Innsbruck, both of Austria

[73] Assignee: Karl Handl, Austria

[21] Appl. No.: 415,364

[22] PCT Filed: Feb. 8, 1988

[86] PCT No.: PCT/AT88/00006
§ 371 Date: Jul. 26, 1989
§ 102(e) Date: Jul. 26, 1989

[87] PCT Pub. No.: WO88/05634
PCT Pub. Date: Aug. 11, 1988

[30] Foreign Application Priority Data

Feb. 9, 1987 [AT] Austria .................................. 257/87

[51] Int. Cl.$^5$ ............................................. F26B 19/00
[52] U.S. Cl. .......................................... 34/232; 99/477; 454/174
[58] Field of Search .................. 98/55, 56; 34/23, 232, 34/233, 234, 224; 99/477

[56] References Cited

U.S. PATENT DOCUMENTS 2,841,072 7/1958 Knight .................................... 98/56

Primary Examiner—Henry A. Bennet
Attorney, Agent, or Firm—Notaro & Michalos

[57] ABSTRACT

In order to dry or ripen foodstuffs giving off humidity, a processing room (1) with air inlets (7) on its lower side is disclosed. The air inlets are formed by the peripheral openings of textile hoses (6) suspended above the surface of the floor (2). Aisles and/or traffic lanes (10, 11) are provided between the hoses (6).

5 Claims, 2 Drawing Sheets

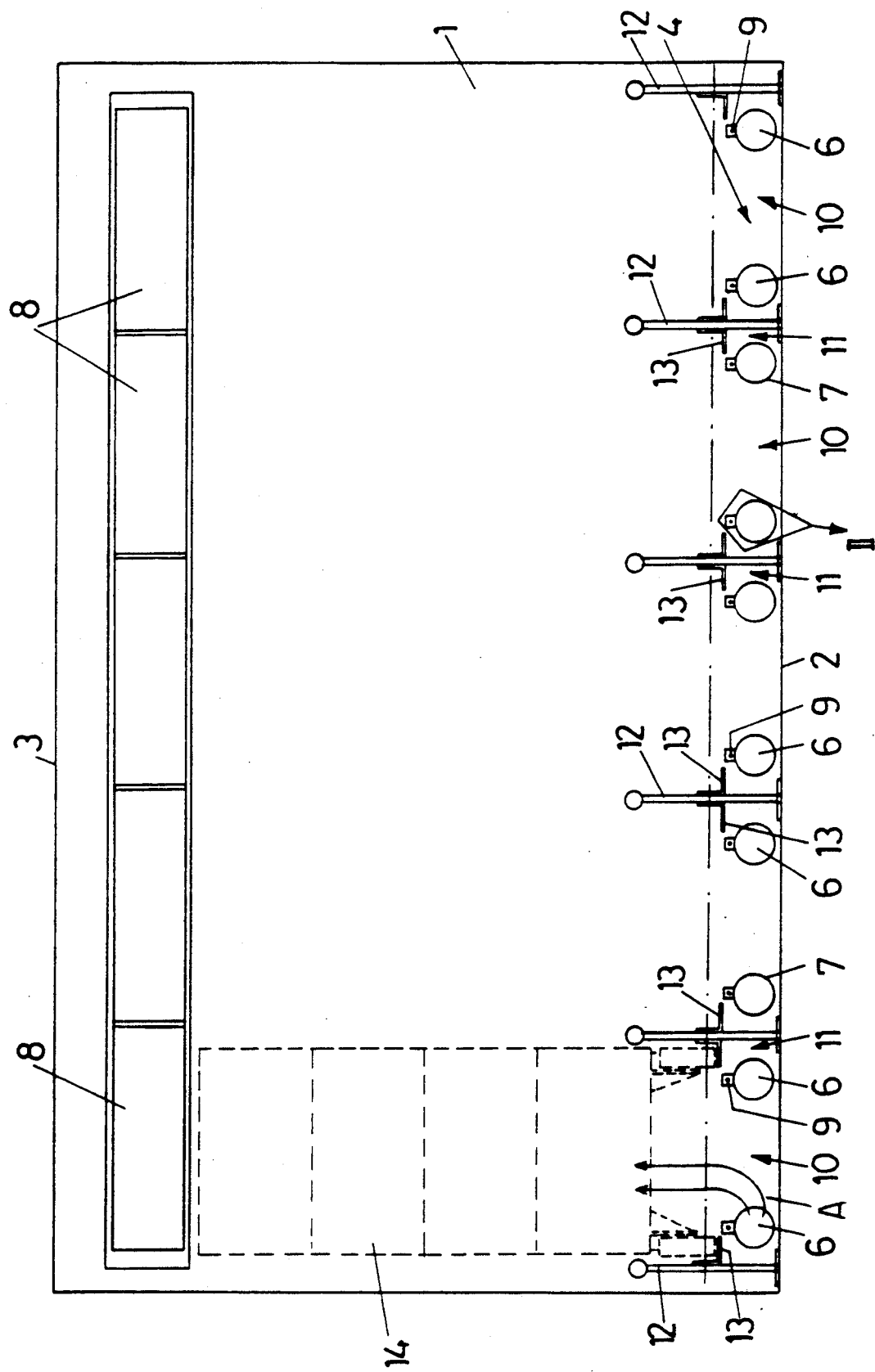

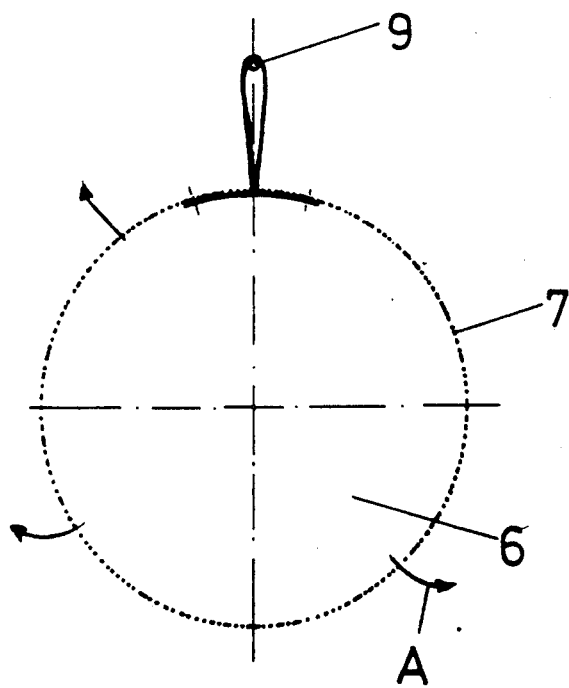

PROCESSING ROOM FOR DRYING OR RIPENING FOODSTUFFS WHICH GIVE OFF HUMIDITY

FIELD AND BACKGROUND OF THE INVENTION

The invention relates to a processing room for drying or ripening foodstuffs which give off humidity, particularly meat products, which are exposed to a stream of unsaturated air which enters through air inlets distributed over the bottom and is extracted through air outlet orifices at the top.

A processing room of this type is known, for instance, from CH-A-603060. This shows a tunnel-like processing room, the bottom of which is formed by a load bearing coarse grid under which extends the air supply duct. Over the whole arched roof area, the rising air is drawn into a waste air duct and is fed in again under the floor. The floor grid has rails for transporter trolleys on which the material to be processed is moved through the processing room.

Thus, the air is supplied through a plurality of inlet apertures in the floor, so preventing any large-volume eddy formation. Since the supplied air is intended to absorb the water given off by the material being processed, it is unsaturated and hence heavier than the more humid waste air, so that by reason of the differing density, a vertical upwards flow becomes established. The air consequently rises to the roof of the processing room, where it can emerge. The more regularly the supplied air leaves the inlet apertures and, without any dead corners, is able to follow a plurality of parallel flow paths, the higher will be quality of the dried or ripened products.

Different drying rates lead to losses of product quality. For example, in the case of smoked bacon, excessively fast drying leads to a hardening at the edges, while too little ventilation adversely affects the removal of moisture.

It has been found that very low flow speeds (between 0.01 and 0.5 m/sec) provide the best drying results. The flow speed ought thereby to be approximately high enough that the air can just absorb that amount of moisture which an undisturbed capillary movement of water in the material being processed sets free at the surface. The grid floor described in CH-A-603060 is too large-meshed to fulfil the requirement of fine dispersal. However, walking on them would make smaller-mesh grids dirty and clogged, so that the regularity of the air flow would not be guaranteed in this case either.

SUMMARY OF THE INVENTION

The invention is based on the problem of providing a processing room in which an extremely regular air dispersion and air flow can be achieved and be maintained even after the floor has been worked on many times.

According to the invention, this is achieved in that the air inlet apertures are formed by the peripheral orifices in a plurality of textile hoses which are suspended at intervals from one another and from the floor and which extend over its length or width.

It has been found that despite the fact that air does not emerge over the entire surface area of the floor, the desired extremely regular dispersion of air is achieved which permits of a minimal flow rate. For example, ultra-fine fabrics which permit of an hourly throughput of 250 cu.m of air per sq.m with a pressure drop of 120 Pa are ideal. For example, the hoses can have a diameter of 10 to 20 cm and be suspended at a distance apart of 30 to 60 cm and at a distance of 5 to 20 cm from the floor, so that in the intermediate spaces, the floor of the processing room can be walked on freely and without any risk of dirt clogging the air inlet apertures. According to the dimensions of the processing room and of the textile hoses, the floor clearance of the transporter trolleys may be too low so that one embodiment may provide for the tracks to have rails which are raised well above the hose suspension level. Thus, the hoses extend in any case underneath the incoming transporter trolleys and between each pair of tracks there is still an aisle left on the floor. The ultra-fine dispersion of the supplied air, in spite of the fact that the outlet directions are not parallel, results in a virtually turbulence-free flow of air at a very low speed, only the transporter trolleys causing the unavoidable disturbances, but not the disposition and dispersion of the air inlet apertures in the processing room as a whole. A blower required for air throughput likewise only influences the rate but not the direction of flow.

The processing room can readily be used also as a smoking room, in which case it is preferable for separate smoke inlet and outlet apertures to be provided.

BRIEF DESCRIPTION OF THE DRAWINGS

The invention will now be described in greater detail hereinafter, although without being in any way limited thereby, with reference to the accompanying drawings, in which:

FIG. 1 is a vertical section through a processing room, and

FIG. 2 shows an enlarged detail II from FIG. 1.

DESCRIPTION OF THE PREFERRED EMBODIMENT

A processing room 1 comprises a floor area 2 which may, for example, be between 50 and 150 sq.m. The materials to be processed, particularly meat products, such as smoked bacon, etc., are suspended on transporter trolleys 14 and conveyed into the processing room 1 in which they are exposed, for example, to a flow of air (arrow A) for three to four weeks, the air absorbing the moisture which is to be extracted from or which is given off by the materials being processed, after which the moisture is carried away. Air inlet apertures 7 are distributed over the area of the floor 2 along a marginal zone 4. The marginal zone 4 is not physically divided from the processing room 1 but is at a height above the floor area 2 which permits of air supply. In FIG. 1, however, the marginal zone 4 is, by way of illustration, represented by an imaginary dash-dotted separation line. The air inlet apertures 7 are formed by peripheral orifices in hoses 6 which consist of an air permeable fabric of minimal mesh size, the hoses having a diameter of, for example, 15 cm. The dry air emerging from the hoses 6 has a low flow velocity of about 0.01 to 0.5 m/sec, so that despite the universally directed air outlet orifices 7 (FIG. 2) above the marginal zone 4, an even upwards flow is assured with neither zones of too high nor zones with too low a flow velocity.

The hoses 6 are fixed to a suspension 9 at a distance from the floor area 2, the suspension 9 consisting of a taut wire which passes through loops on the hoses 6. At their head ends, the hoses 6 are connected to an air supply duct, while at the other end they are sealed.

The air emerges through outlet orifices 8 in the region of the roof 3 and which are only shown diagrammatically. The air outlet orifices 8 can also be formed by mesh openings if a suitable fabric is stretched under the roof 3. In order to be able to travel and walk over the floor of the processing room 1, in spite of the hoses 6 being suspended above the floor area 2, tracks 11 are provided for the transporter trolleys 14. These are formed by supports 12 and rails 13 which are mounted on them, supports 12 disposed in the middle of the processing room each carrying a rail 13 on either side of it. The travelling level is therefore above the suspension 9 for the hoses 6, substantially at the height of the imaginary separating plane of the marginal zone 4, above which a parallel upwards movement of supplied air is substantially guaranteed. Between the tracks 11 are aisles 10 to permit of handy pushing of individual transporter trolleys 14. If the processing room 1 is also to be used as a smoking chamber, then it is preferable for separate smoke inlet apertures (not shown) to be provided in the marginal zone 4 and for smoke outlet orifices to be provided in the roof area. It is, however, likewise conceivable for the smoke to be let in and out through the apertures 7 and 8 provided for the air system.

Since the air becomes lighter as it absorbs moisture, the direction of flow A corresponds to the natural movement of air, so that the blower is required only to increase the flow velocity but not in order to maintain a direction of flow. Since also there is a considerable throughput of air per hour even without blower assistance, an energy saving operation of the processing room is achieved and high quality products are obtained.

We claim:

1. A process room arrangement for drying foodstuffs which give off humidity, using an unsaturated substantially vertical stream of air, said processing room having a floor with a length, and a roof spaced above the floor, the arrangement comprising:
    means for suspending the foodstuffs at a spaced location above the floor and within the room;
    a plurality of air permeable textile hoses suspending at a level above the floor and at intervals from one another along the floor and below the foodstuffs, the hoses extending over the length of the floor and defining a multiplicity of air inlet orifices from the hoses into the room;
    a plurality of air outlet orifices near the roof for discharging air from the room; and
    a plurality of access aisles provided on the floor and spaced from the hoses.

2. A processing room arrangement according to claim 1, including a plurality of tracks having rails which are raised well above the level of the suspension of the hoses and extend along the aisles.

3. A processing room arrangement according to claim 2, wherein the aisles are between the hoses.

4. A processing room arrangement according to claim 3, wherein the floor has an area of between 50 and 150 square meters.

5. A processing room arrangement according to claim 1, including means for supplying dry air to the hoses for establishing a flow velocity of between about 0.01 and 0.5 meters per second upwardly in the room.

* * * * *